United States Patent [19]

Yoshioka

[11] Patent Number: 5,698,779

[45] Date of Patent: Dec. 16, 1997

[54] APPARATUS FOR DETECTING INTAKE AIR QUANTITY OF INTERNAL COMBUSTION ENGINE HAVING MECHANISM FOR CONTINUOUSLY VARYING VALVE TIMING

[75] Inventor: Mamoru Yoshioka, Susono, Japan

[73] Assignee: Toyota Jidosha Kabushiki Kaisha, Aichi, Japan

[21] Appl. No.: 707,785

[22] Filed: Sep. 4, 1996

[30] Foreign Application Priority Data

Sep. 7, 1995 [JP] Japan .................................. 7-230528

[51] Int. Cl.$^6$ ............................................. G01M 15/00
[52] U.S. Cl. ................................................. 73/118.2
[58] Field of Search ........................... 73/115, 116, 117.2, 73/117.3, 118.1, 118.2, 119 A; 123/90.17, 90.15; 340/439; 364/431.03

[56] References Cited

U.S. PATENT DOCUMENTS

| | | | |
|---|---|---|---|
| 4,984,456 | 1/1991 | Takahashi | 73/118.2 |
| 5,029,569 | 7/1991 | Cullen et al. | 73/118.2 |
| 5,107,724 | 4/1992 | Takizawa | 364/431.05 |
| 5,270,935 | 12/1993 | Dudek et al. | 73/118.2 |
| 5,271,360 | 12/1993 | Kano et al. | 123/90.17 |
| 5,377,112 | 12/1994 | Brown, Jr. et al. | 73/117.3 |
| 5,423,208 | 6/1995 | Dudek et al. | 73/118.2 |
| 5,465,617 | 11/1995 | Dudek et al. | 73/118.2 |
| 5,546,795 | 8/1996 | Yamagishi | 73/118.2 |

FOREIGN PATENT DOCUMENTS

| | | |
|---|---|---|
| 3-185250 | 8/1991 | Japan . |
| 4-159426 | 6/1992 | Japan . |
| 4-175430 | 6/1992 | Japan . |
| 4-269339 | 9/1992 | Japan . |

*Primary Examiner*—George M. Dombroske
*Attorney, Agent, or Firm*—Kenyon & Kenyon

[57] ABSTRACT

An apparatus for detecting the quantity of intake air to be compared with a reference quantity is arranged in an internal combustion engine having a mechanism for continuously varying the open/close timing of at least one of the intake valves and the exhaust valves. The apparatus has a unit for detecting a load of the engine and a unit for detecting an actual quantity of intake air according to the detected load and valve timing that is dependent on the detected load.

4 Claims, 17 Drawing Sheets

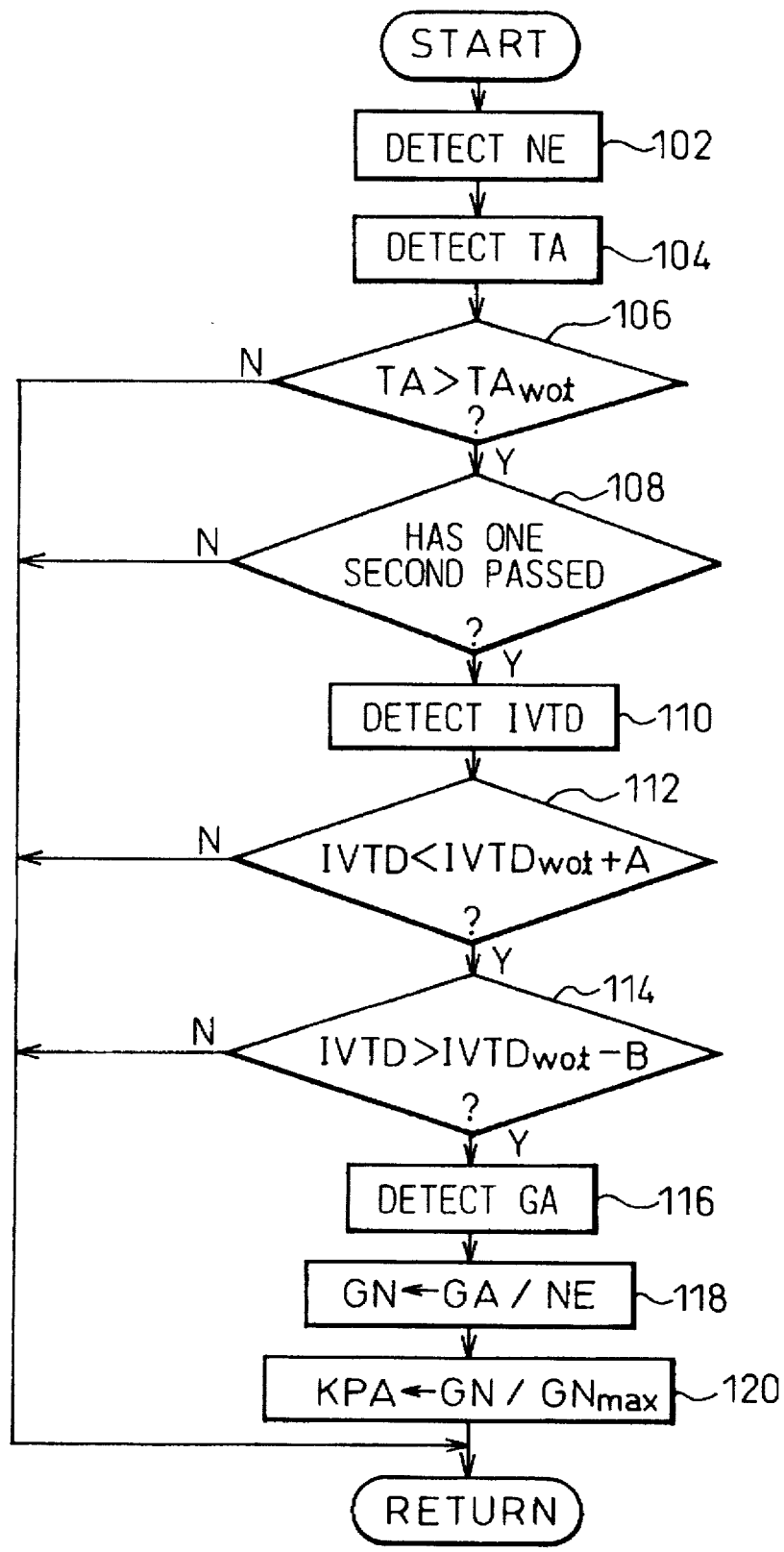

NE [rpm]

| TA [deg] | 1200 | 1400 | ~ | 6000 | 6400 |
|---|---|---|---|---|---|
| 5.0 | 0.90 | 0.80 | ~ | 0.20 | 0.19 |
| 7.5 | 1.20 | 1.05 | ~ | 0.30 | 0.28 |
| 10.0 | 1.40 | 1.30 | ~ | 0.40 | 0.38 |
| ≀ | ≀ | ≀ | ≀ | ≀ | ≀ |
| 75.0 | 1.45 | 1.50 | ~ | 1.50 | 1.45 |
| 80.0 | 1.45 | 1.50 | ~ | 1.55 | 1.50 |

APPARATUS FOR DETECTING INTAKE AIR QUANTITY OF INTERNAL COMBUSTION ENGINE HAVING MECHANISM FOR CONTINUOUSLY VARYING VALVE TIMING

BACKGROUND OF THE INVENTION

1. Field of the Invention

The present invention relates to an internal combustion engine having a mechanism for continuously varying the timing of opening and closing an intake or exhaust valve and, particularly, to an apparatus for detecting an actual quantity of intake air of the engine and comparing it with a reference quantity, to determine, for example, an altitude.

2. Description of the Related Art

There are many mechanisms that optimize the open/close timing of valves of an automobile engine according to driving conditions. Among them are ON/OFF mechanisms. To provide high-performance engines, the ON/OFF mechanisms are being replaced with continuously variable valve timing mechanisms that always optimize valve timing as disclosed in Japanese Unexamined Patent Publication No. 4-175430 (corresponding to U.S. Pat. No. 5,271,360). These mechanisms are intended to improve the efficiency of an intake action and an internal exhaust gas recirculation (EGR) system, to thereby increase the engine output, purify the exhaust gas, and to reduce pumping loss and fuel consumption.

Japanese Unexamined Patent Publication No. 4-269339 controls the valve timing of an engine according to the operating conditions of the engine and atmospheric pressure. If atmospheric pressure decreases, the disclosure increases an internal EGR quantity, i.e., a valve overlap period, to reduce fuel consumption. This technique employs an atmospheric pressure sensor. Some altitude detecting techniques detect atmospheric pressure without atmospheric pressure sensors, thereby cutting costs.

The above disclosure (4-269339) employs an airflow meter to detect the quantity of intake air. Another technique employs a thermal airflow meter to directly detect the mass of intake air while the engine is running, compares it with a reference quantity that is obtained at low altitudes, and according to the difference between the quantities, indirectly detects the atmospheric pressure. This indirect technique will be explained.

If the revolution speed and throttle opening of an engine are unchanged, an actual intake air quantity GN of the engine, i.e., the mass of intake air per engine revolution is dependent on air density, i.e., atmospheric pressure. Namely, the ratio of the intake air quantity GN to a reference quantity, which is assumed at low altitudes under the same engine speed and throttle opening as those that have provided the intake air quantity GN, is proportional to an atmospheric pressure PA, as shown in FIG. 1. A thermal airflow meter directly detects the mass of intake air, which is used to indirectly detect atmospheric pressure.

The atmospheric pressure must be detected when the intake air quantity GN is stable with respect to a throttle opening TA. Namely, it is preferable to detect atmospheric pressure when the throttle opening is wide (wide-open-throttle: WOT) to indicate that the load of the engine is high, as shown in FIG. 2. Reference intake air quantities and corresponding engine speeds (NE) are measured in the wide-open-throttle state at low altitudes and stored as a map in a memory. While the engine is being operated in the wide-open-throttle state, an actual quantity of intake air is detected and compared with a corresponding reference quantity that is found according to an engine speed at the time.

When the valve timing of the engine is varied, the quantity of intake air fluctuates accordingly even if the engine speed and throttle opening are unchanged. The valve timing varying mechanism always changes valve timing and involves a response delay. Accordingly, the quantity of intake air will not be stable even in the wide-open-throttle state. FIG. 3 shows a relationship of intake air quantity GN and the valve timing displacement IVTD of an intake valve in the wide-open-throttle state. Even in the wide-open-throttle state, IVTD will not be equal to IVTDwot, which is set for the wide-open-throttle state, due to the response delay. Accordingly, for the engine having the mechanism for continuously varying valve timing, the behavior of the valve timing control must be considered when detecting the quantity of intake air. Considering only a throttle opening will lead to detecting an incorrect quantity of intake air.

In principle, an actual quantity of intake air must be detected according to the revolution speed, throttle opening, and valve timing of the engine and be compared with a corresponding reference quantity. For this purpose, maps of reference quantities and corresponding engine speeds and throttle openings may be prepared for each valve timing displacement IVTD so that a corresponding one of them is compared with an actual quantity of intake air. This, however, requires a high-performance CPU and increases costs.

SUMMARY OF THE INVENTION

An object of the present invention is to provide an apparatus for detecting the quantity of intake air of an internal combustion engine having a mechanism for continuously varying valve timing, capable of correctly detecting an actual quantity of intake air to be compared with a reference quantity. Another object of the present invention is to provide an altitude detecting system of simple structure for the engine.

In order to accomplish the objects, a first aspect of the present invention provides an apparatus for detecting the quantity of intake air of an internal combustion engine having a mechanism for continuously varying the valve timing of at least one of the intake valves and the exhaust valves. The apparatus has a unit for detecting an engine load and a unit for detecting an actual quantity of intake air according to the detected load and valve timing that is determined by the detected load. The detected intake air quantity is compared with a reference quantity.

In the engine having the mechanism for continuously varying valve timing, the quantity of intake air is dependent on valve timing, which involves a response delay. Accordingly, confirming only a high engine load is insufficient to correctly detect the quantity of intake air. To correctly detect the quantity of intake air, the first aspect of the present invention additionally considers valve timing.

A second aspect of the present invention employs the apparatus of the first aspect and detects an actual quantity of intake air when valve timing is stable with respect to a change in the load of the engine, to improve the correctness of the detected quantity.

A third aspect of the present invention provides the apparatus of the second aspect with a unit for detecting actual valve timing. The third aspect detects an actual quantity of intake air if the load of the engine is high and if actual valve timing is around target valve timing that is determined by the high engine load, to improve the correctness of the detected quantity.

A fourth aspect of the present invention provides the apparatus of the second aspect with a unit for detecting actual valve timing. The fourth aspect detects an actual quantity of intake air if the load of the engine is intermediate and if actual valve timing is near the most advanced valve timing.

The third aspect may have a small number of detection frequencies because it carries out a detection only when the engine load is high. There are other regions where valve timing is stable. These are a most delayed valve timing region and a most advanced valve timing region. The most delayed valve timing region involves a low load, and therefore, the quantity of intake air fluctuates in response to a change in the load. Accordingly, this region is improper to correctly detect the quantity of intake air. The most advanced valve timing region involves an intermediate load and causes little change in the quantity of intake air in response to a change in the load. Accordingly, this region is proper to correctly detect the quantity of intake air. The fourth aspect detects an actual quantity of intake air if the engine load is intermediate and if actual valve timing is around the most advanced value timing, to improve the precision of the detected quantity.

A fifth aspect of the present invention employs the apparatus of the first aspect. The fifth aspect sets target valve timing according to an engine load, estimates, according to the operating conditions of the engine, a response delay time in attaining the target valve timing under the high load, and detects an actual quantity of intake air after the response delay time, to improve the correctness of the detected quantity.

BRIEF DESCRIPTION OF THE DRAWINGS

The features and advantages of the present invention will be apparent from the following description with reference to the accompanying drawings, in which:

FIG. 8 is a flowchart showing a routine for detecting the quantity of intake air according to the first embodiment;

DESCRIPTION OF THE PREFERRED EMBODIMENTS

The embodiments of the present invention will be explained with reference to the drawings.

Figure 4:
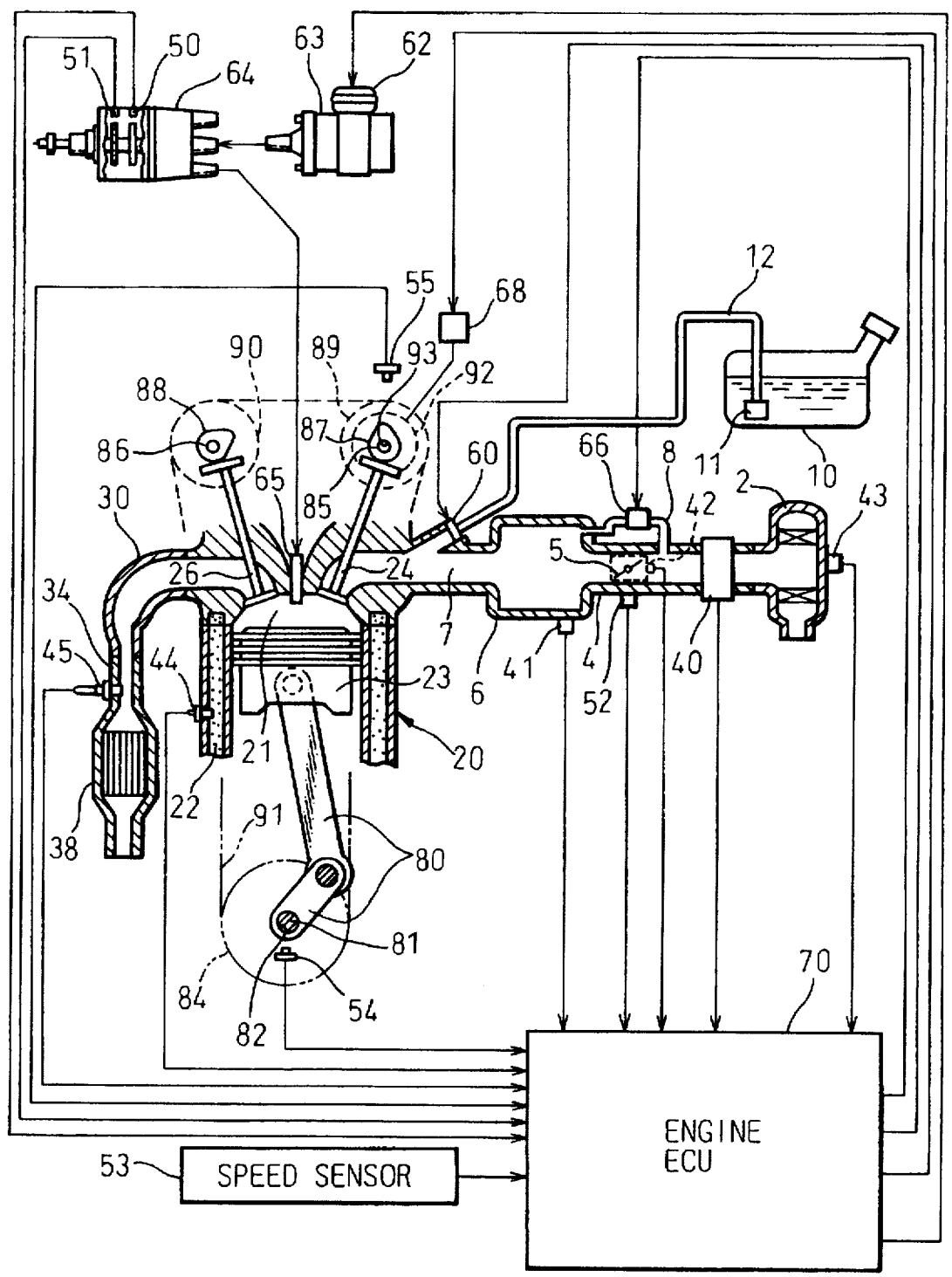
FIG. 4 is a general view showing an electronically controlled internal combustion engine having an apparatus for detecting the quantity of intake air according to an embodiment of the present invention.

FIG. 4 is a general view showing an electronically controlled internal combustion engine having an apparatus for detecting the quantity of intake air according to an embodiment of the present invention. An air cleaner 2 filters air necessary for combustion, a throttle body 4 passes the air, and a surge tank (intake manifold) 6 distributes the air to an intake duct 7 of each cylinder. A throttle valve 5 is arranged in the throttle body 4, to adjust the quantity of intake air. A thermal airflow meter 40 measures the mass of intake air. A temperature sensor 43 detects the temperature of intake air. A vacuum sensor 41 detects the pressure of the intake duct 7.

A throttle sensor 42 detects the opening of the throttle valve 5. When the throttle valve 5 is closed, an idle switch 52 is turned on to generate a throttle closed signal. An idling adjusting path 8 bypasses the throttle valve 5 and has an idling speed control valve (ISCV) 66 for adjusting an airflow rate during an idling period.

Fuel in a fuel tank 10 is pumped by a fuel pump 11, is passed through a fuel pipe 12, and is injected by a fuel injector 60 into the intake duct 7.

The intake duct 7 mixes the fuel with air, and the air-fuel mixture is drawn into a combustion chamber 21 of a cylinder 20 through an intake valve 24. The air-fuel mixture is compressed by a piston 23, ignited, and combusted to produce power. An igniter 62 generates an ignition signal to control a primary current of an ignition coil 63. A secondary current of the ignition coil 63 is supplied to a spark plug 65 through an ignition distributor 64, to thereby ignite the air-fuel mixture in the combustion chamber 21.

The distributor 64 has a reference position sensor 50 and a crank angle sensor 51. The sensor 50 generates a reference position pulse for every 720 degrees in crank angle. The sensor 51 generates a position pulse for every 30 degrees in crank angle. A speed sensor 53 generates a pulse representing an actual vehicle running speed. A cooling water path 22 guides cooling water to cool the engine 20. A water temperature sensor 44 detects the temperature of the cooling water.

An exhaust valve 26 discharges an exhaust gas of the combusted air-fuel mixture into an exhaust manifold 30 connected to an exhaust pipe 34. The exhaust pipe 34 has an $O_2$ sensor 45 to detect the concentration of oxygen in the exhaust gas. A catalytic converter 38 is arranged in the exhaust pipe 34 downstream from the sensor 45. The catalytic converter 38 contains a three-way catalyst for promoting the oxidization of unburned components such as HC and CO as well as the reduction of nitrogen oxides ($NO_x$). The purified exhaust gas from the catalytic converter 38 is discharged outside the vehicle.

A mechanism for opening and closing the intake valve 24 and exhaust valve 26 will be explained. The piston 23 is connected to a crankshaft 81 through a connecting rod 80. An end of the crankshaft 81 has a timing pulley 84. The intake valve 24 is driven by a cam 87 attached to a cam shaft 85. The exhaust valve 26 is driven by a cam 88 attached to a cam shaft 86. An end of the cam shaft 85 has a timing pulley 89. An end of the cam shaft 86 has a timing pulley 90. The timing pulleys 89 and 90 are connected to the timing pulley 84 through a timing belt 91. As a result, the crankshaft 81 drives the cam shafts 85 and 86 to open and close the valves 24 and 26 at predetermined crank angles. The crank shaft 81 has a buried magnet 82, so that a first magnetic sensor 54 arranged close to the crankshaft 81 may generate a reference pulse. The cam shaft 85 of the intake valve 24 has a buried magnet 93, so that a second magnetic sensor 55 arranged close to the cam shaft 85 may generate a reference pulse.

A continuously varying mechanism 92 having a known structure to determine the open/close timing of the intake valve 24 is arranged between the cam shaft 85 and the timing pulley 89. The mechanism 92 turns the cam shaft 85 and timing pulley 89 relative to each other. More precisely, the mechanism 92 uses the cam shaft 85 and timing pulley 89 as external gears and connects them to each other through an intermediate helical gear. The helical gear is axially moved by oil pressure, to drive the cam shaft 85 and timing pulley 89 relative to each other. The oil pressure is controlled by a control valve 68.

Figure 5:
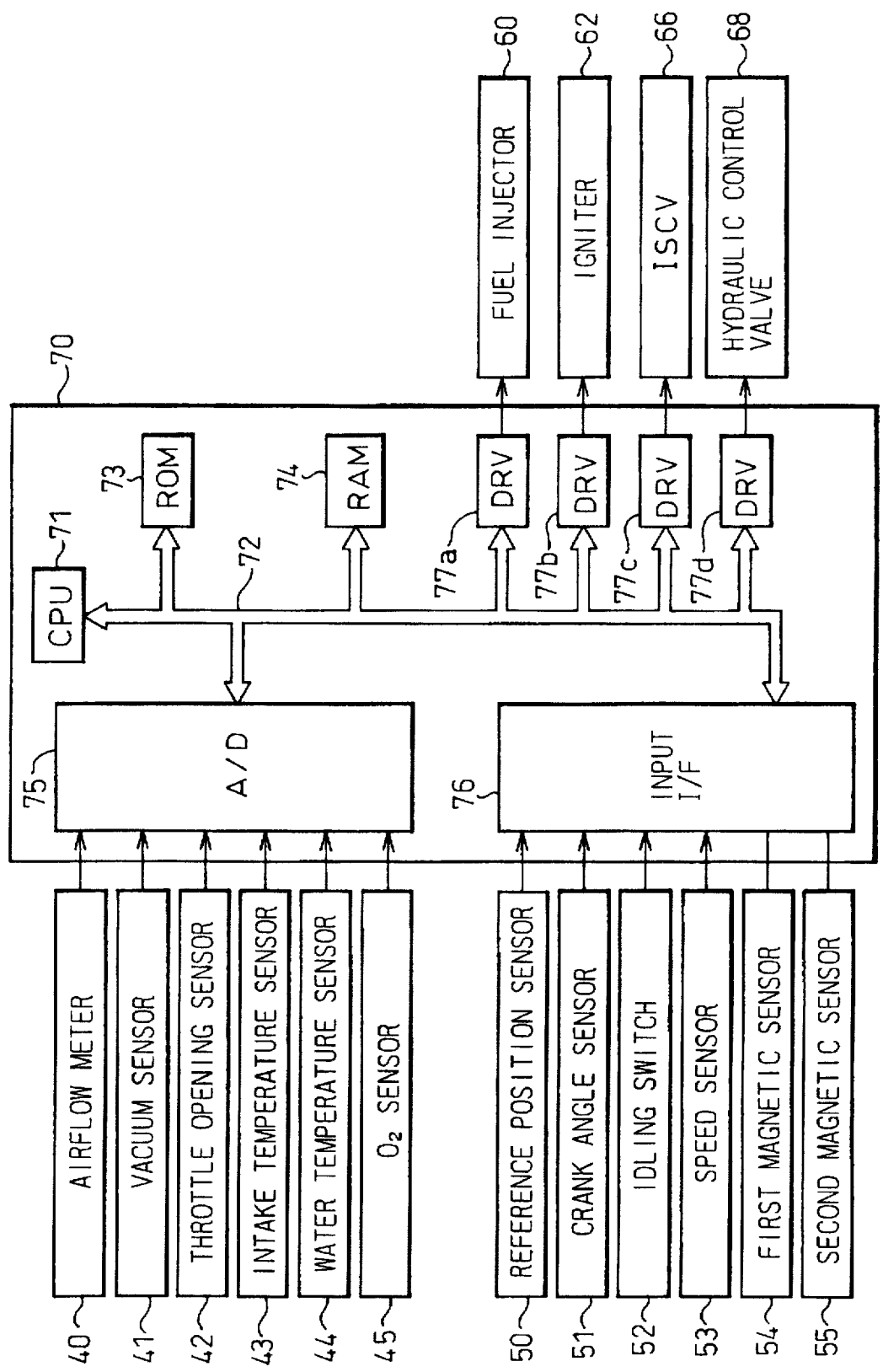
FIG. 5 is a block diagram showing an electronic control unit of the engine of FIG. 4.

An electronic engine control unit (ECU) 70 is a microcomputer to control fuel injection, ignition timing, idling speed and, in addition, detection of intake air quantity according to the present invention. FIG. 5 is a block diagram showing the hardware of the control unit 70. A read-only memory (ROM) 73 stores programs and maps. A central processing unit (CPU) 71 receives signals from the sensors and switches through an A/D converter 75 and an interface 76, processes the signals, and provides actuator control signals through drive control circuits 77a to 77d. A random-access memory (RAM) 74 temporarily stores data during the operation of the CPU 71. These elements are connected to one another through a system bus 72 containing address, data, and control buses.

An engine control process carried out by the control unit 70 will be explained.

Fuel injection control refers to the mass of intake air per engine revolution, calculates a fuel injection quantity, i.e., an injection period of the fuel injector 60 to achieve a target air-fuel ratio, and instructs the drive control circuit 77a to inject fuel from the fuel injector 60 at a given crank angle. The mass of intake air per engine revolution is calculated according to the mass of intake air measured by the thermal airflow meter 40 and an engine speed detected by the crank angle sensor 51. The fuel injection quantity is subjected to corrections such as a basic correction according to signals from the throttle sensor 42, intake temperature sensor 43, water temperature sensor 44, etc., an air-fuel ratio feedback correction according to a signal from the $O_2$ sensor 45, and an airfuel ratio learning correction to equalize a central feedback correction value with a theoretical air-fuel ratio.

Ignition timing control collectively checks engine conditions according to an engine speed detected by the crank angle sensor 51 and signals from other sensors, calculates optimum ignition timing, and provides an ignition signal to the igniter 62 through the drive control circuit 77b.

Idling speed control detects an idling state according to a throttle closed signal from the idle switch 52 and a vehicle speed signal from the speed sensor 53, calculates a target speed according to the temperature of cooling water measured by the water temperature sensor 44, compares the target speed with an actual speed, determines a control quantity to attain the target speed according to the difference between the target and actual speeds, and controls the idling speed control valve 66 through the drive control circuit 77c, to thereby adjust the quantity of air and optimize the idling speed.

Valve timing control sets the target open/close timing of the intake valve 24 according to the operating conditions of the engine and controls the mechanism 92. More precisely, the oil pressure control valve 68 is feedback-controlled according to signals from the magnetic sensors 54 and 55 so that the cam shaft 85 of the intake valve 24 maintains a required rotational phase with respect to the crankshaft 81.

Figure 6:
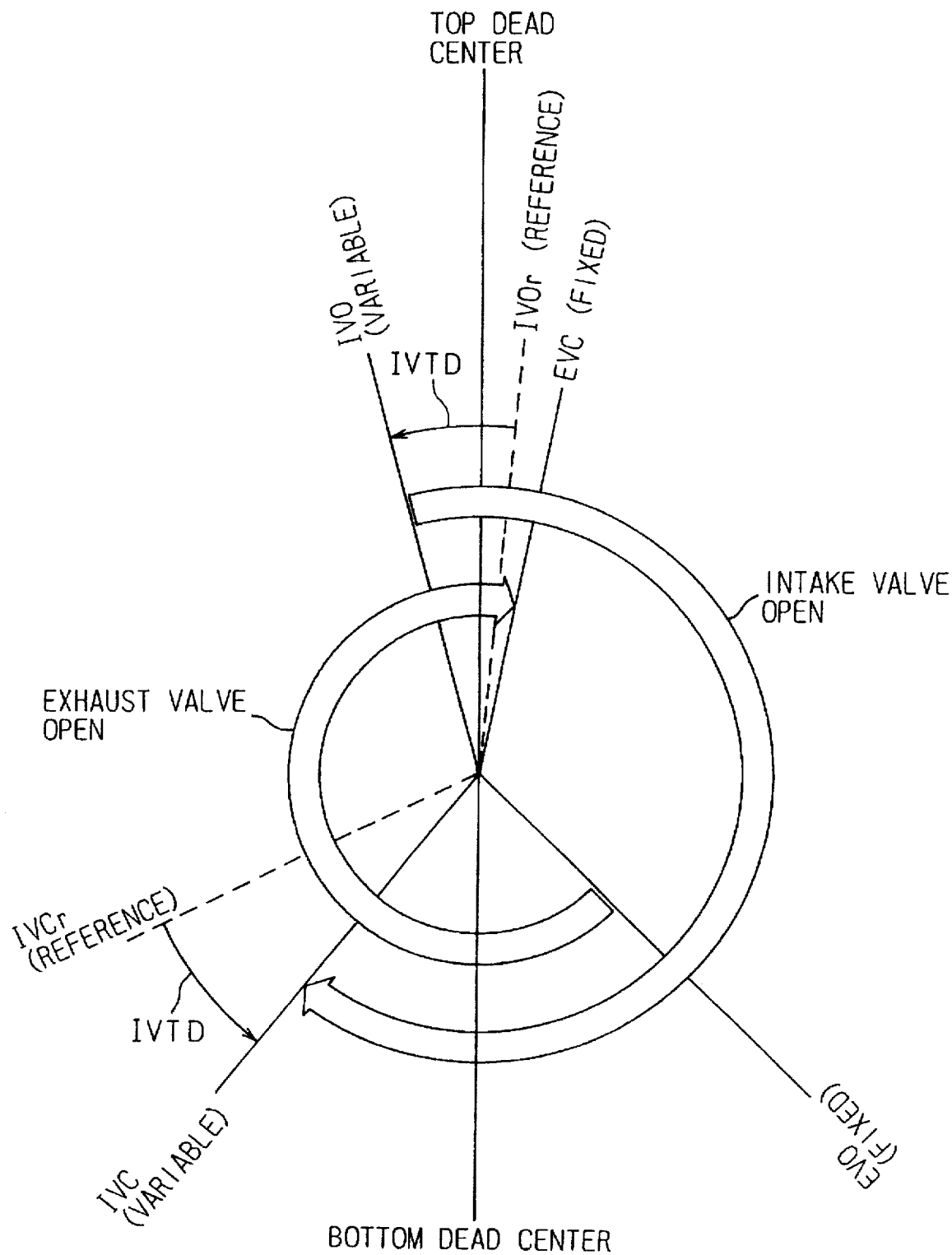
FIG. 6 shows the valve timing of intake and discharge valves and corresponding crank angles.

FIG. 6 is a timing chart showing crank angles corresponding to the open/close timing of the intake and exhaust valves 24 and 26. The exhaust valve 26 is opened at fixed valve open timing EVO, for example, 50 degrees before a bottom exhaust dead center and is closed at fixed valve close timing EVC, for example, 3 degrees after a top exhaust dead center. On the other hand, the intake valve 24 involves a fixed open period and variable valve opening timing IVO and valve close timing IVC. The most delayed timing IVOr and IVCr of the intake valve 24 serve as reference positions. The open/close timing of the intake valve 24 is optionally set at positions ahead of the reference positions. A valve timing displacement IVTD is a target control quantity. The reference valve open timing IVOr is, for example, 3 degrees after the top exhaust dead center, and the reference valve close timing IVCr is, for example, 65 degrees after a bottom intake dead center. If the displacement IVTD is equal to a crank angle of 30 degrees, the valve open timing IVO is 27 degrees before the top exhaust dead center, and the valve close timing IVC is 35 degrees after the bottom intake dead center. A maximum value of the valve timing displacement IVTD is, for example, 60 degrees in crank angle.

Each of the above control operations needs an altitude correction, i.e., an atmospheric pressure correction. The present invention simply and indirectly detects atmospheric pressure without an atmospheric pressure sensor. The present invention compares an actual quantity of intake air provided by the thermal airflow meter 40 with a reference quantity obtained at low altitudes and provides an atmospheric pressure. To improve the correctness of the detected quantity of intake air, the present invention takes an intake valve timing displacement into account. The three embodiments of the present invention for detecting the quantity of intake air in consideration of an intake valve timing displacement will be explained in detail.

Figure 1:
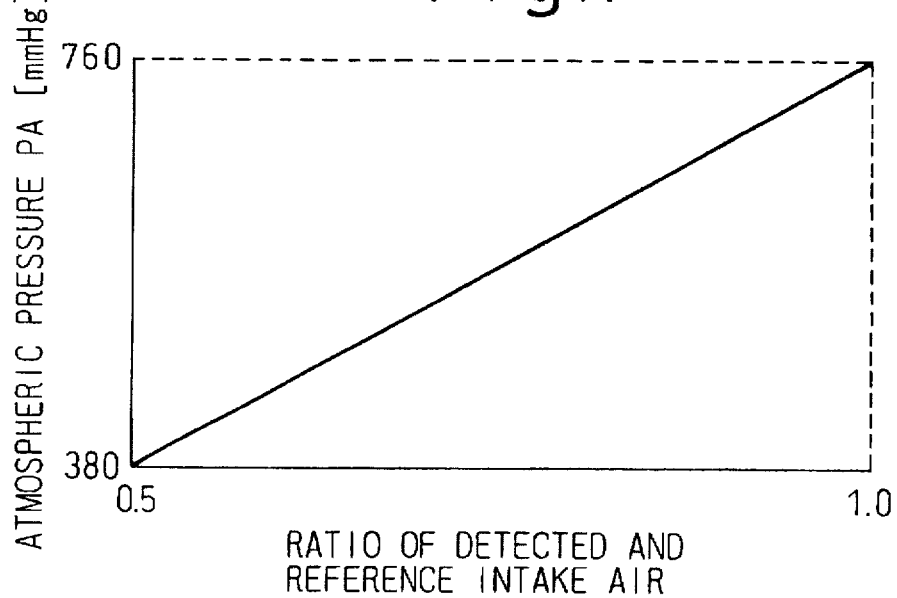
FIG. 1 is a graph showing a relationship of intake air ratio (GN ratio) (the ratio of an actual quantity of intake air to a reference quantity) and atmospheric pressure PA.
Figure 2:
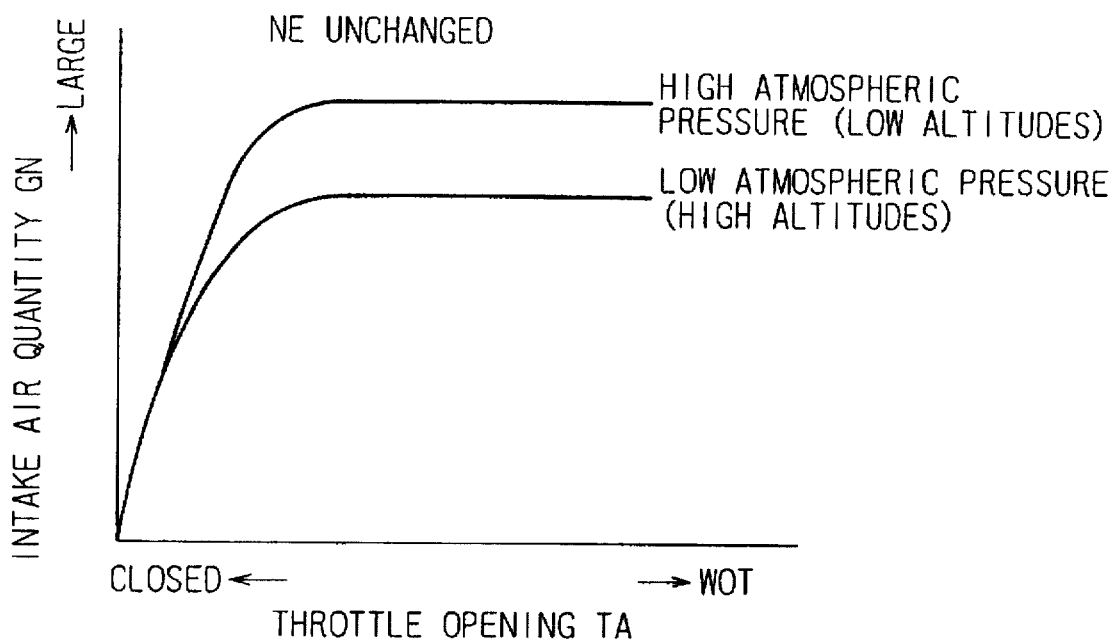
FIG. 2 is a graph showing relationships of throttle opening TA and intake air quantities GN at low and high altitudes with an engine speed NE being unchanged.
Figure 3:
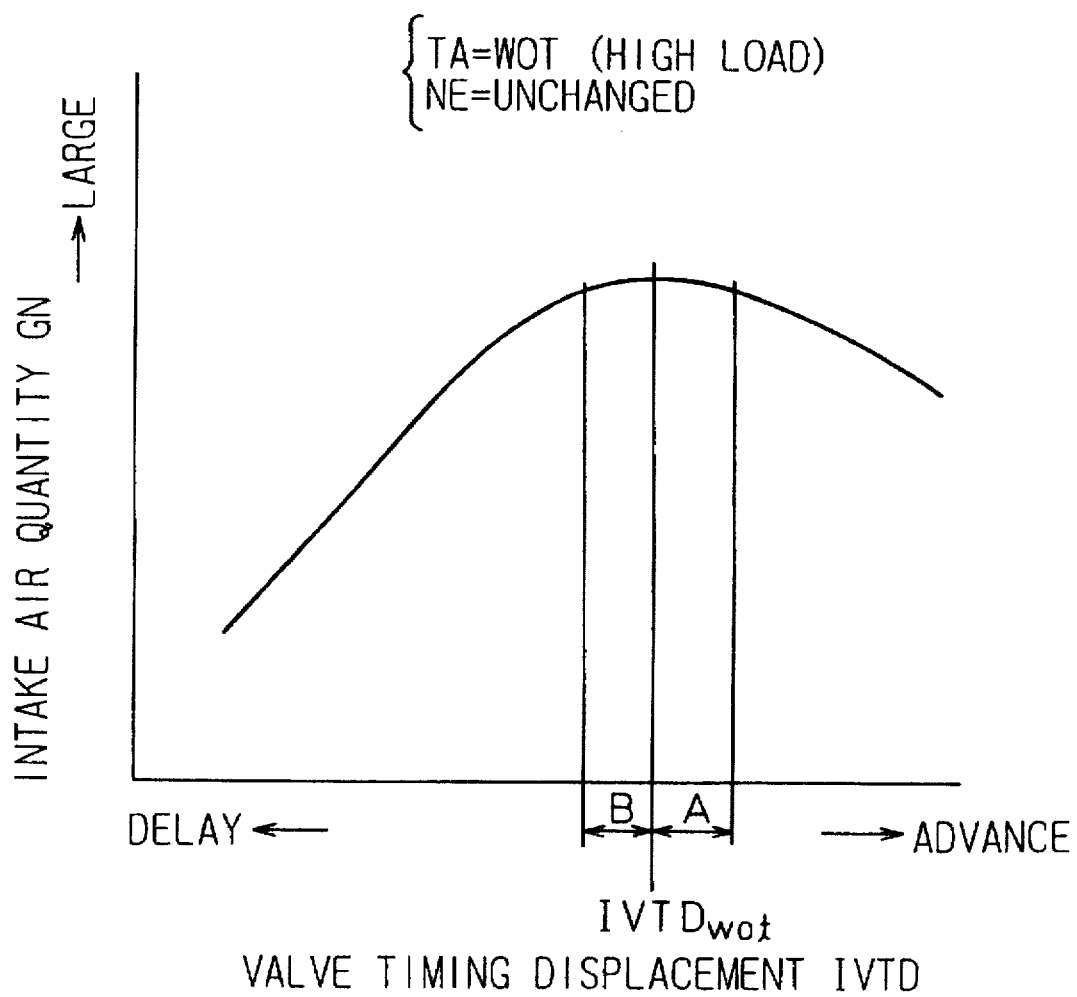
FIG. 3 is a graph showing a relationship of valve timing displacement IVTD and intake air quantity GN under a high engine load with an engine speed NE being unchanged.
Figure 7A:
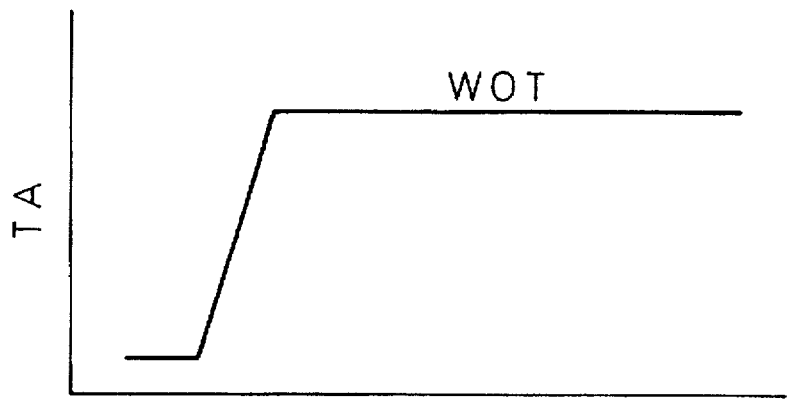
FIGS. 7A to 7C show a throttle opening TA, a valve timing displacement IVTD, and an intake air quantity GN, respectively, during acceleration.
Figure 7B:
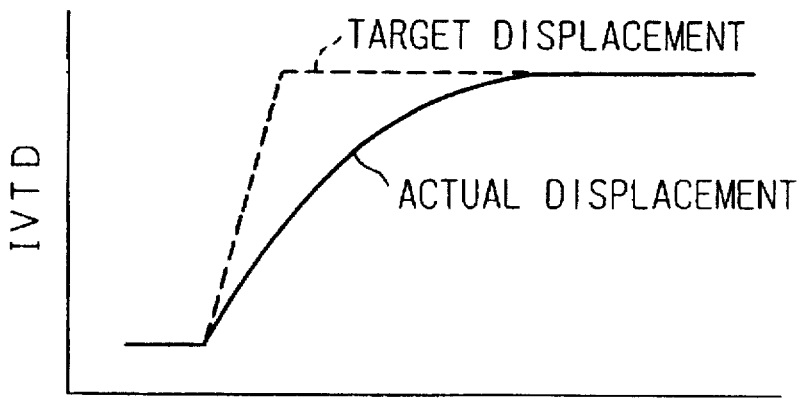
Figure 7C:
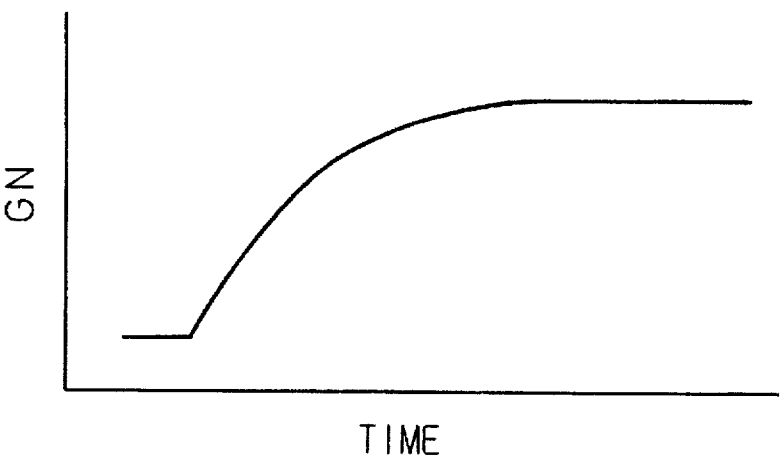

The first embodiment of the present invention is based on the first to third aspects thereof. As explained with reference to FIG. 3, the mass of intake air (GN) per engine revolution fluctuates under a high engine load in response to a change in the valve timing displacement IVTD of the intake valve 24. FIGS. 7A, 7B, and 7C show a throttle opening TA, the valve timing displacement IVTD, and the intake air quantity GN, respectively, during acceleration. The valve timing displacement IVTD involves a control response delay. The first embodiment detects an actual quantity of intake air if the throttle opening TA is above a reference opening TAwot to indicate that the load of the engine is high and if the valve timing displacement IVTD is around a reference displacement IVTDwot that is determined by the high engine load. Namely, the first embodiment detects an actual quantity of intake air when the following conditions are met:

$$IVTDwot-B<IVTD<IVTDwot+A$$

Figure 9:
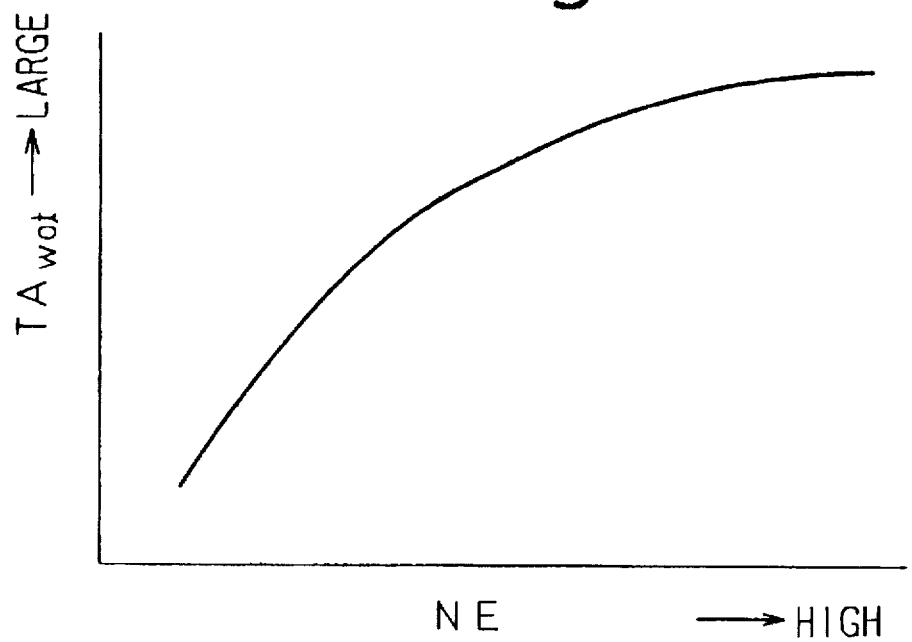
FIG. 9 is a map used to determine a throttle opening TAwot according to an engine speed NE.
Figure 10:
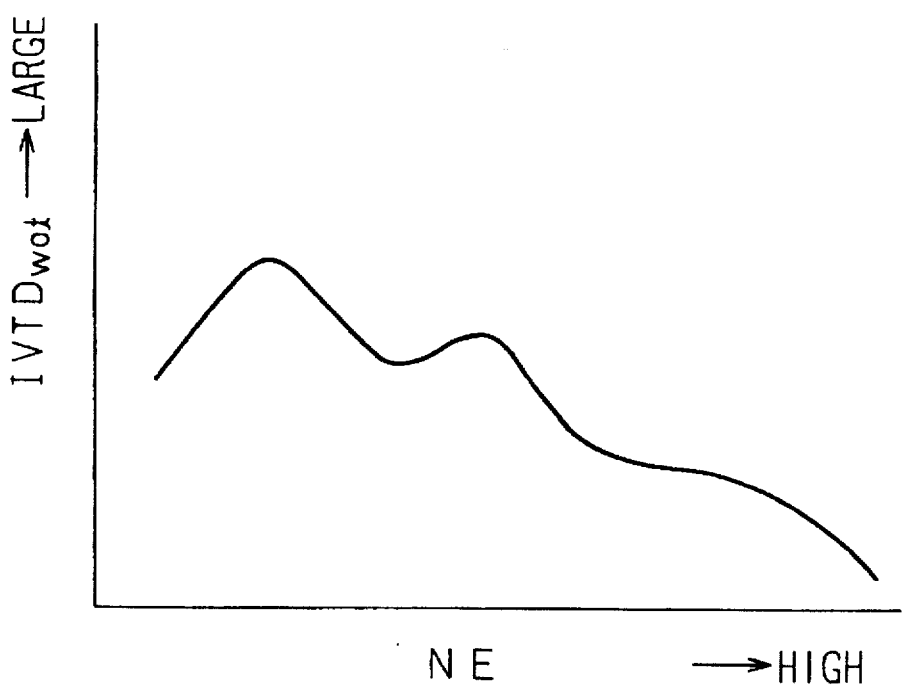
FIG. 10 is a map used to determine a valve timing displacement IVTDwot according to an engine speed NE.
Figure 11:
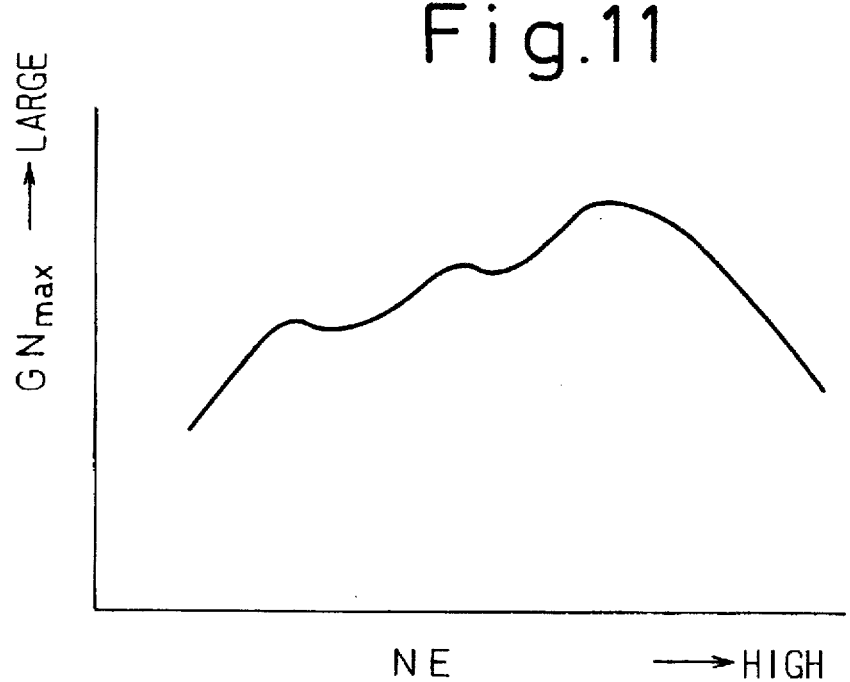
FIG. 11 is a map used to determine an intake air quantity GNmax according to an engine speed NE.

FIG. 8 is a flowchart showing a routine for detecting the quantity of intake air according to the first embodiment. This routine is carried out at regular intervals. Step 102 detects an engine speed NE according to the output of the crank angle sensor 51. Step 104 detects a throttle opening TA according to the output of the throttle opening sensor 42. Step 106 determines whether or not the throttle opening TA is greater than the reference opening TAwot to determine whether or not the engine load is high. The reference opening TAwot is retrieved, according to the engine speed NE, from a map of FIG. 9 stored in the ROM 73. If TA<TAwot, the routine ends, and if TA>TAwot, step 108 determines whether or not one second has passed after the high load has been established. This one second corresponds to a response delay in valve timing control. If one second has not passed yet, the routine ends. If it has passed, step 110 detects an intake valve timing displacement IVTD according to signals from the magnetic sensors 54 and 55. Step 112 determines if IVTD<IVTDwot+A. The reference valve timing displacement IVTDwot for the high load is determined by the engine speed NE. Various values of IVTDwot and corresponding engine speeds are stored as a map of FIG. 10 in the ROM 73. If step 112 provides NO, the routine ends, and if YES, step 114 determines if IVTD>IVTDwot−B. If step 114 provides NO, the routine ends, and if YES, it is determined that the conditions to detect the quantity of intake air are met, and step 116 is carried out.

Step 116 detects a mass GA of intake air according to the output of the thermal airflow meter 40. Step 118 calculates a mass GN of intake air per engine revolution as follows:

$$GN \leftarrow GA/NE$$

Step 120 calculates an atmospheric (altitude) correction coefficient KPA according to the ratio of GN to a reference quantity GNmax that is determined by the engine speed NE, as follows:

$$KPA \leftarrow GN/GNmax$$

The reference value GNmax is obtained at low altitudes in the wide-open-throttle (WOT) state under a high engine load. Various values of GNmax and corresponding engine speeds NE are stored as a map in the ROM 73. The atmospheric pressure correction coefficient KPA thus obtained is used for various control operations.

The second embodiment of the present invention will be explained. The second embodiment is a combination of the first embodiment and the fourth aspect of the present invention. The detecting operation of the first embodiment is not frequently achieved when the engine is operated normally because the first embodiment detects the quantity of intake air only under a high engine load, i.e., in the wide-open-throttle (WOT) state. To frequently detect the quantity of intake air, it must also be detected out of the high load state, too. A map that lists reference intake air quantities and corresponding engine speeds and throttle openings must be prepared at low altitudes with stable valve timing.

Figure 12:
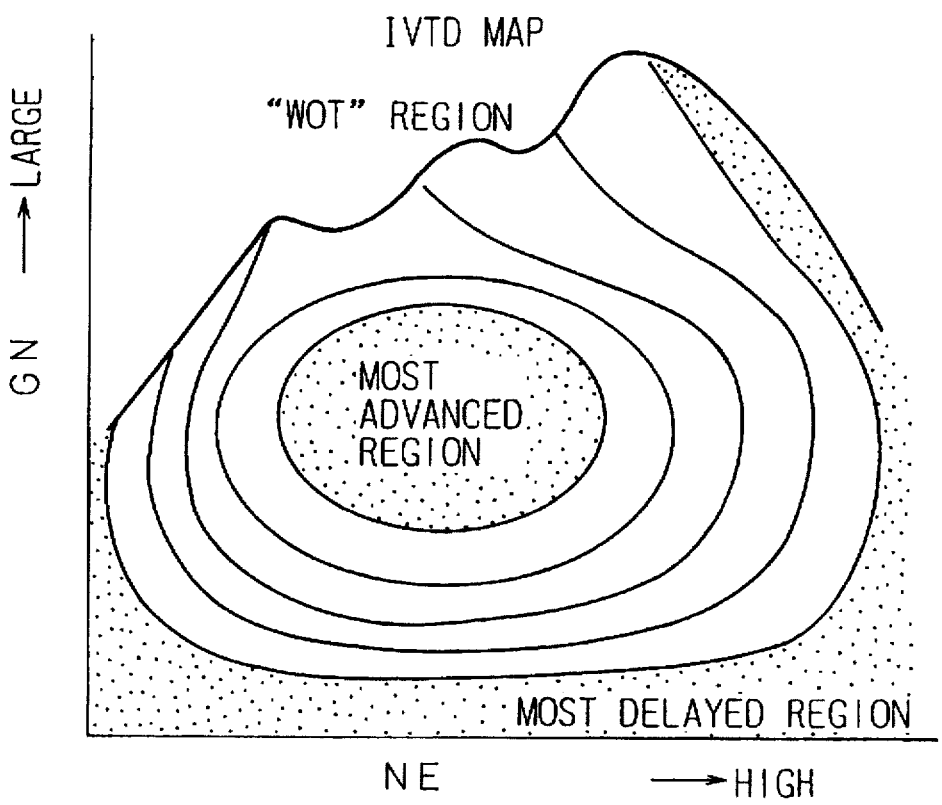
FIG. 12 is a map used to determine a target valve timing displacement IVTD according to an engine speed NE and an intake air quantity GN.
Figure 13:
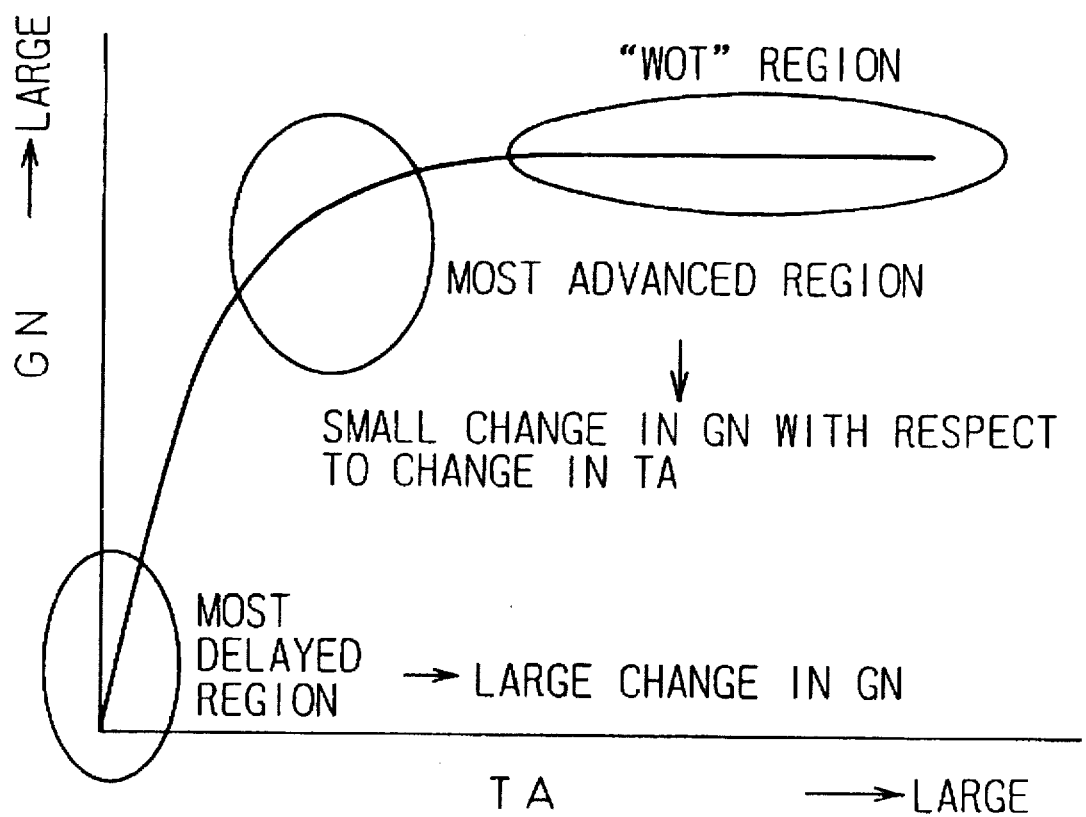
FIG. 13 is a graph showing a relationship of a throttle opening TA and an intake air quantity GN.

FIG. 12 is a map showing various valve timing displacements IVTD corresponding to engine speeds NE and intake air quantities GN. Valve timing is stable in the wide-open-throttle state and in the most advanced and delayed valve timing regions. The most delayed valve timing region involves a low engine load with which the intake air quantity GN fluctuates greatly in response to a change in the throttle opening TA as shown in FIG. 13. Namely, it is difficult to correctly detect the quantity of intake air in the most delayed valve timing region. The most advanced valve timing region involves an intermediate engine load with which the intake air quantity GN is stable with respect to a change in the throttle opening TA. Namely, the most advanced valve timing region is advantageous in correctly detecting the quantity of intake air. The most advanced valve timing region is used by a usual driving operation and is wide. Accordingly, the second embodiment prepares a map of reference intake air quantities tGNTA60 and corresponding throttle openings TA and engine speeds NE for the most advanced valve timing region (IVTD=IVTDmax corresponding to 60 degrees in crank angle). The second embodiment detects an actual intake air quantity GN in the most advanced valve timing region, too.

Figure 14:
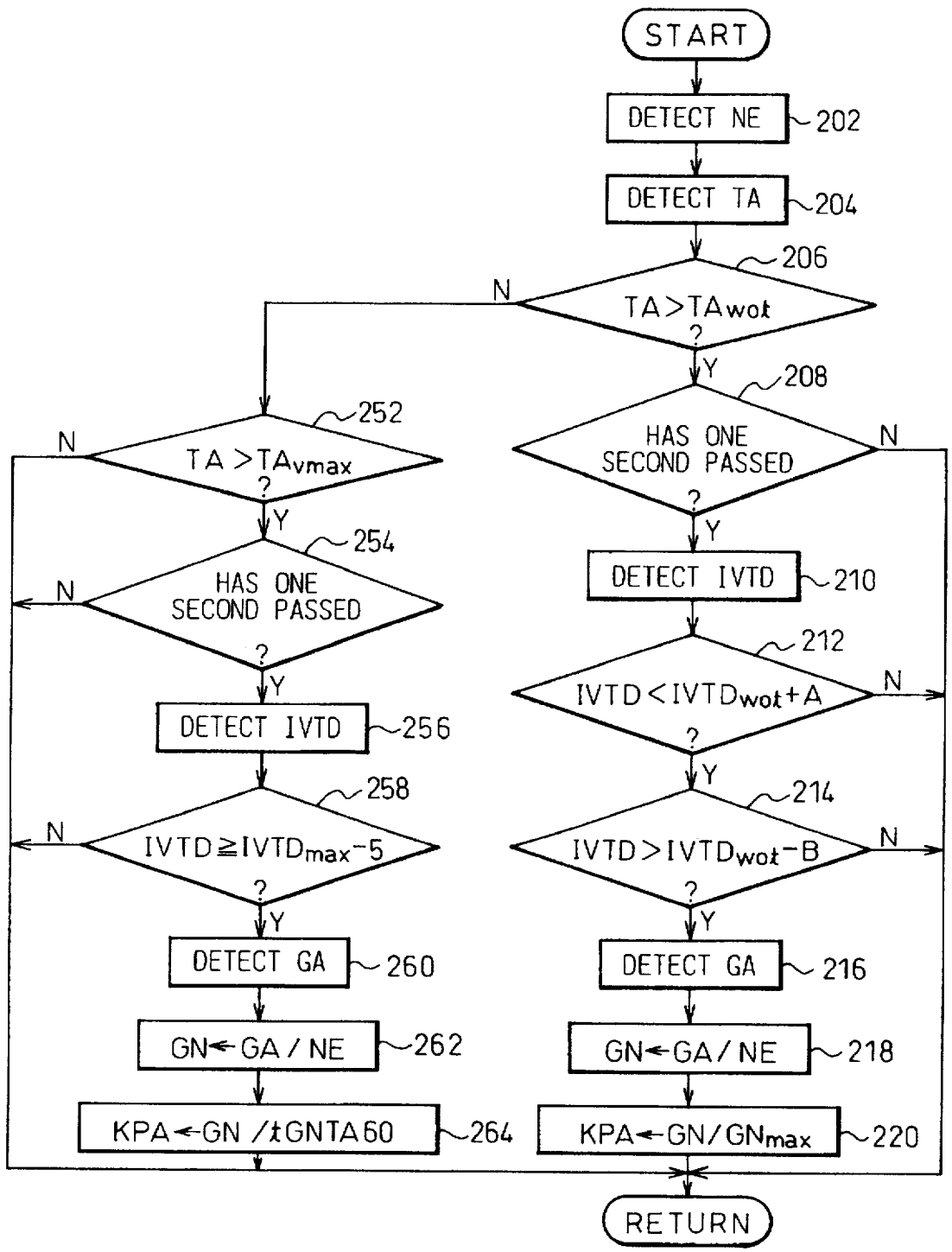
FIG. 14 is a flowchart showing a routine for detecting the quantity of intake air according to a second embodiment of the present invention.

FIG. 14 is a flowchart showing the operation of the second embodiment. Steps 202 to 220 are identical to steps 102 to 120 of FIG. 8 of the first embodiment and detect an actual quantity of intake air in the wide-open-throttle state, i.e., under a high engine load and calculates an atmospheric correction coefficient. If step 206 determines that the throttle opening TA is below the reference opening TAwot, i.e., if the engine load is not high, step 252 is carried out.

Figures 15, 16:
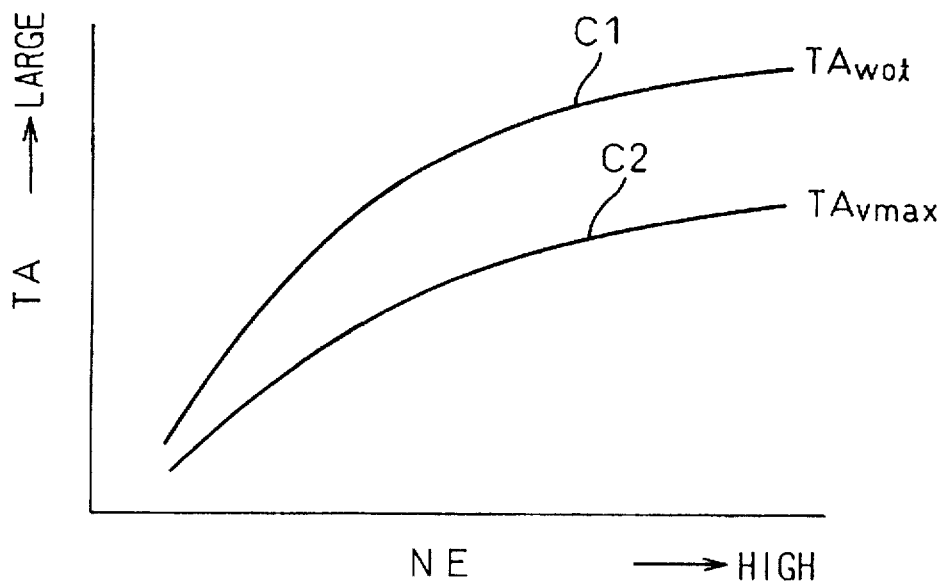
FIG. 15 is a map used to determine the throttle opening TAwot and the throttle opening TAvmax according to an engine speed NE.
FIG. 16 is a map used to find out a reference quantity tGNTA60 for most advanced valve timing, according to an engine speed NE and a throttle opening TA.

Step 252 determines whether or not the throttle opening TA is larger than a reference opening TAvmax, i.e., whether or not the engine load is intermediate. The reference opening TAvmax is determined according to the engine speed NE as indicated with a curve C2 of FIG. 15. Various values of TAvmax and corresponding engine speeds NE are stored as a map in the ROM 73. A curve C1 of FIG. 15 is identical to the curve of FIG. 9. If the engine load is not intermediate, the routine ends, and if it is, step 254 determines whether or not the intermediate load has lasted for one second. This one second corresponds to a response delay in valve timing control. If one second has not passed yet, the routine ends, and if it has, step 256 detects an intake valve timing displacement IVTD according to signals from the magnetic sensors 54 and 55. Step 258 determines whether or not the detected displacement IVTD is greater than IVTDmax minus five degrees in crank angle, i.e., 55 degrees in crank angle. Here, IVTDmax is a maximum valve timing displacement corresponding to 60 degrees in crank angle. If step 258 provides NO, the routine ends, and if YES, it is determined that it is in the most advanced valve timing region, and step 260 is carried out.

Step 260 detects a mass GA of intake air according to the output of the thermal airflow meter 40. Step 262 calculates an intake air quantity GN per engine revolution as follows:

$$GN \leftarrow GA/NE$$

Step 264 calculates an atmospheric (altitude) correction coefficient KPA as follows:

$$KPA \leftarrow GN/tGNTA60$$

The reference intake air quantity tGNTA60 for low altitudes and for the most advanced valve timing is determined according to the engine speed NE and throttle opening TA. Various values of tGNTA60 and corresponding engine speeds and throttle openings are stored as a map of FIG. 16 in the ROM 73. In this way, the second embodiment achieves a larger number of detecting operations than the first embodiment.

The third embodiment based on the first and fifth aspects of the present invention will be explained. The first and second embodiments detect the quantity of intake air if the intake air quantity and valve timing are stable. For this purpose, the first and second embodiments actually check to see if valve timing is in a proper range. These embodiments start to detect the quantity of intake air one second after the load of the engine has been measured, to deal with a response delay time in the valve timing control. On the other hand, the third embodiment determines whether or not a throttle opening TA is wide to indicate high load under which the intake air quantity GN is stable with respect to a change in the throttle opening TA. Under a high load, the third embodiment estimates a response delay time in attaining target valve timing according to the operating conditions of the engine. Once the estimated delay time has passed, the third embodiment detects an actual quantity of intake air. The third embodiment is quick to detect the quantity of intake air and calculate an altitudes because it does not actually measure valve timing.

Figure 17:
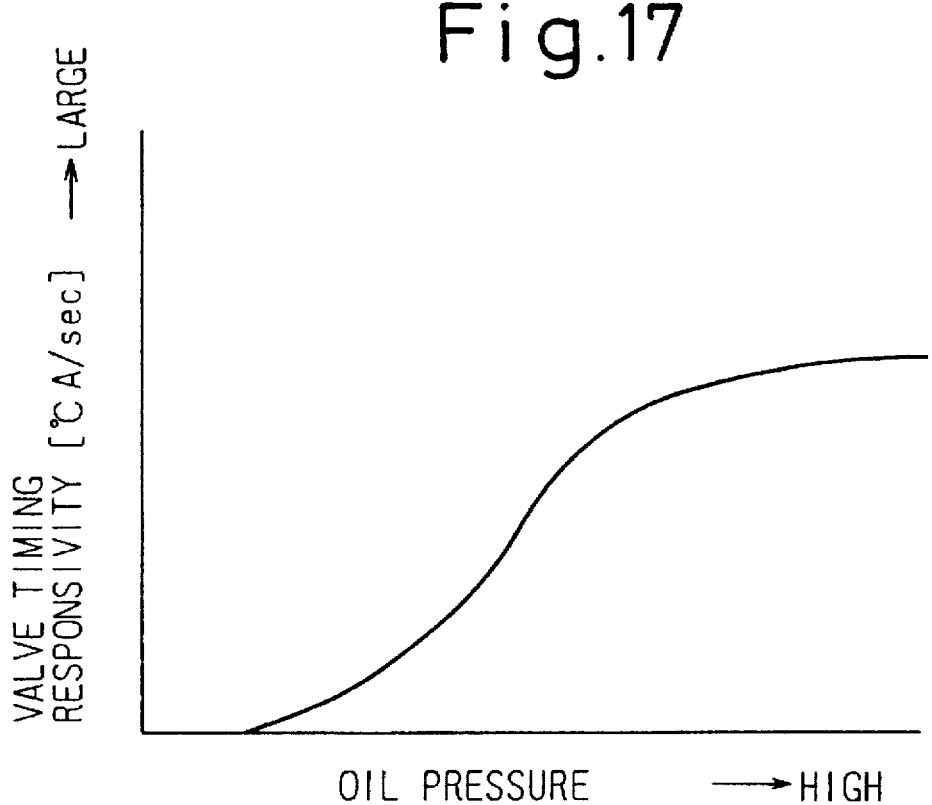
FIG. 17 is a graph showing a relationship of oil pressure and responsivity in a hydraulic mechanism for continuous varying valve timing.
Figure 18:
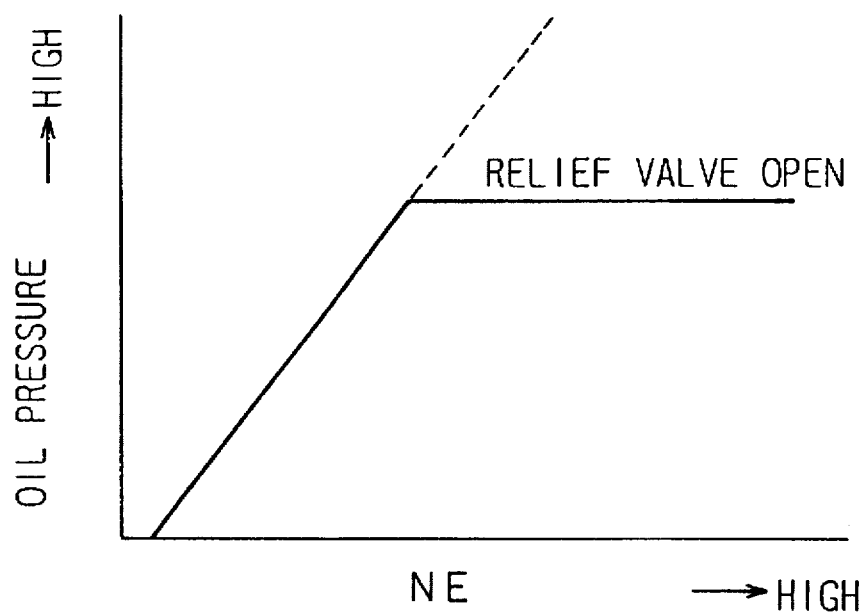
FIG. 18 is a graph showing a relationship of engine speed NE and oil pressure.
Figure 19:
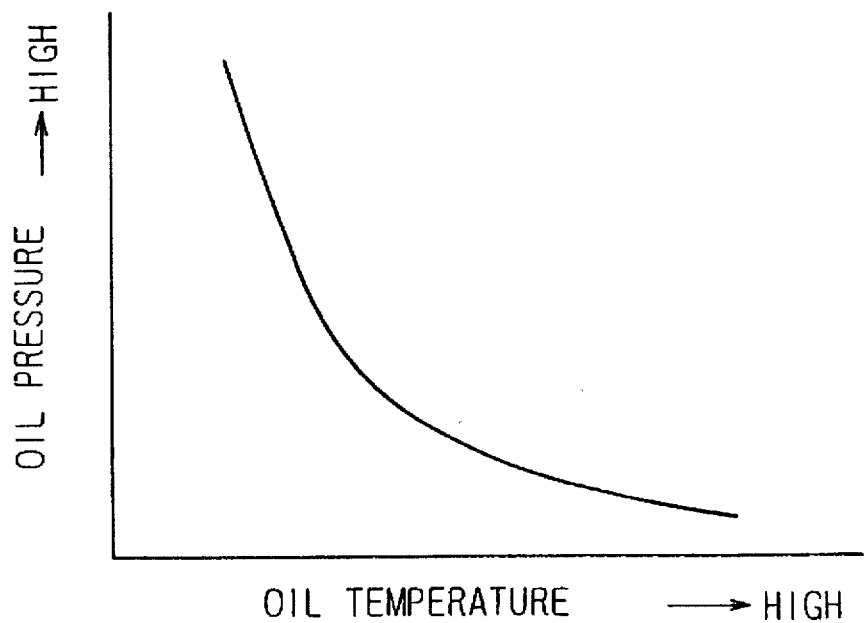
FIG. 19 is a graph showing a relationship of oil temperature and oil pressure.
Figure 21:
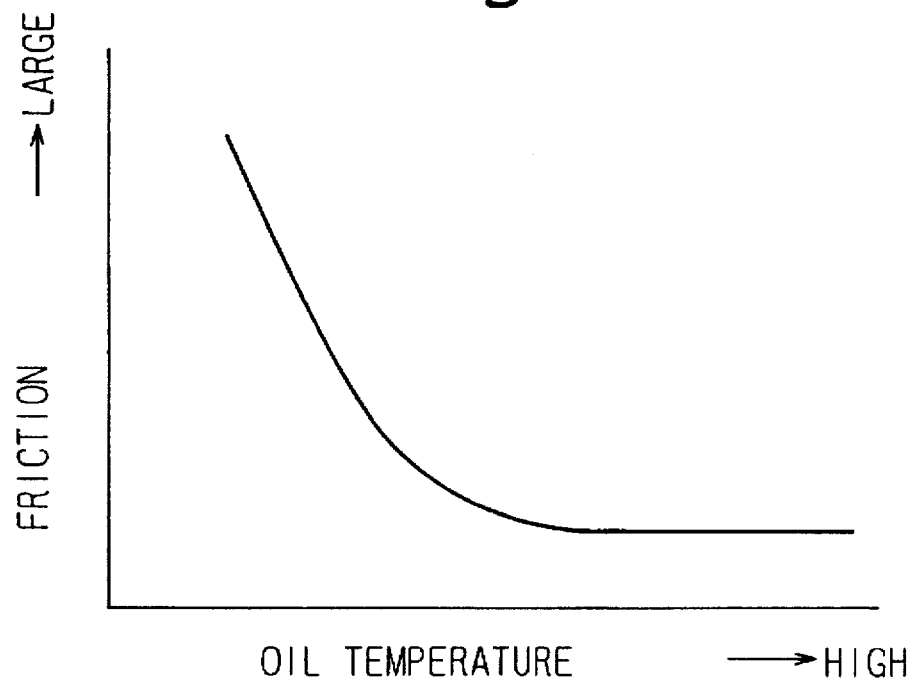
FIG. 21 is a graph showing a relationship of oil temperature and friction.

FIG. 17 shows the responsivity of a hydraulic mechanism for continuously varying valve timing. The responsivity is dependent on oil pressure and drops as the oil pressure decreases. FIGS. 18 and 19 show the dependency of oil pressure on an engine speed NE and oil temperature. The third embodiment determines a basic response time Dne according to an engine speed NE and corrects the same according to a correction coefficient K that is determined according to oil temperature, thereby providing a delay time D in the responsivity of valve timing. The oil pressure increases as the oil temperature decreases as shown in FIG. 19. As the oil temperature decreases, friction increases as shown in FIG. 21, to deteriorate the valve timing responsivity. Accordingly, the correction coefficient K is determined in consideration of an increase in friction when the oil temperature is low, and a decrease in the oil pressure when the oil temperature is high. The correction coefficient K thus obtained increases the basic response time Dne.

Figure 20:
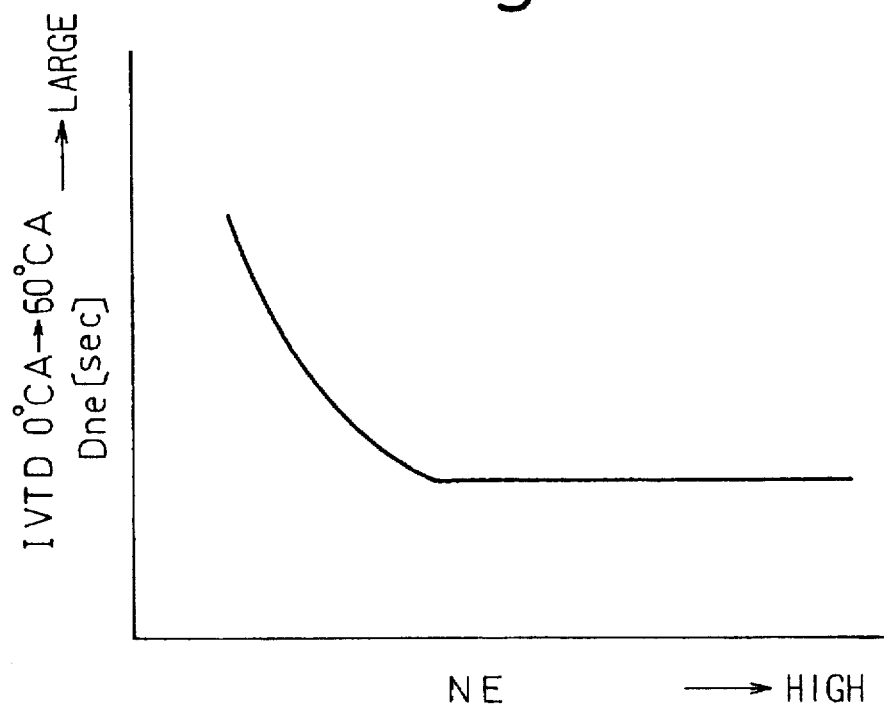
FIG. 20 is a map used to determine a basic response time Dne according to an engine speed NE.
Figure 22:
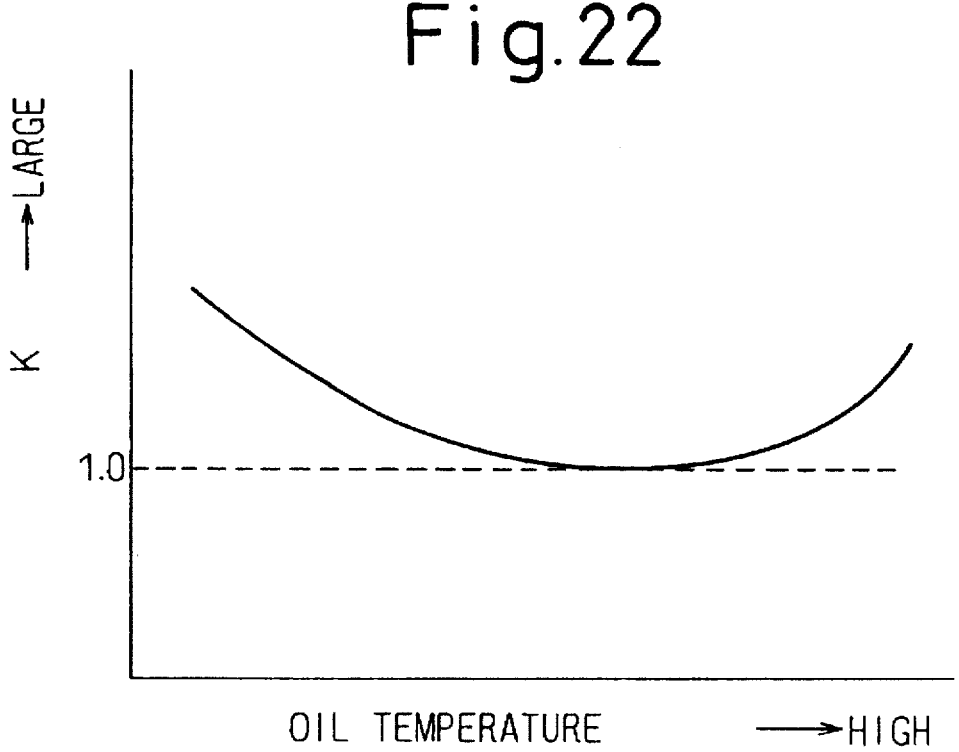
FIG. 22 is a map used to determine a response time correction coefficient K according to oil temperature.
Figure 23:
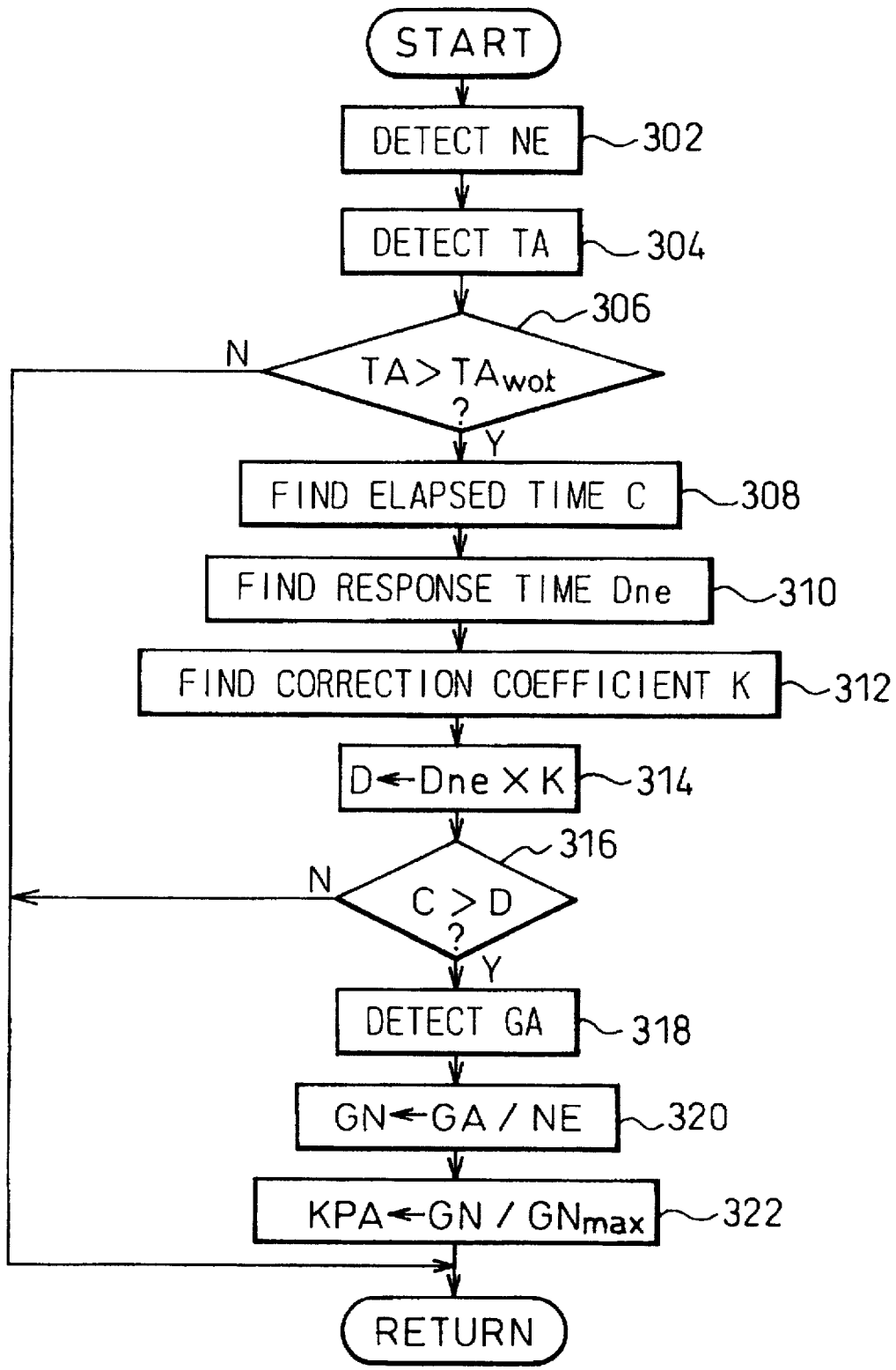
FIG. 23 is a flowchart showing a routine for detecting the quantity of intake air according to a third embodiment of the present invention.

FIG. 23 is a flowchart showing the operation of the third embodiment. Steps 302 to 306 are identical to steps 102 to 106 of FIG. 8 of the first embodiment and steps 202 to 206 of FIG. 14 of the second embodiment and determine whether or not a throttle opening TA is wide to indicate a high load. If TA>TAwot, step 308 calculates a duration C of the high load. Step 310 refers to a map of FIG. 20 and finds out a basic response time Dne of valve timing control according to the present engine speed NE. Step 312 refers to a map of FIG. 22, to find a response time correction coefficient K according to a present oil temperature. These maps are stored in ROM 73 in advance. Step 314 estimates a response delay time D of the valve timing control as follows:

$$D \leftarrow Dne \times K$$

Step 316 compares the duration C with the estimated response delay D. If C≦D, the routine ends, and if C>D, it is determined that conditions for detecting an actual quantity of intake air and determining an altitude are met, and steps 318 to 320 are carried out. These steps 318 to 320 are identical to steps 116 to 120 of FIG. 8 of the first embodiment and steps 216 to 220 of FIG. 14 of the second embodiment. In this way, the third embodiment quickly detects an actual quantity of intake air and determines an altitude when the valve timing is estimated to have reached a target value, without actually detecting valve timing.

Figure 24:
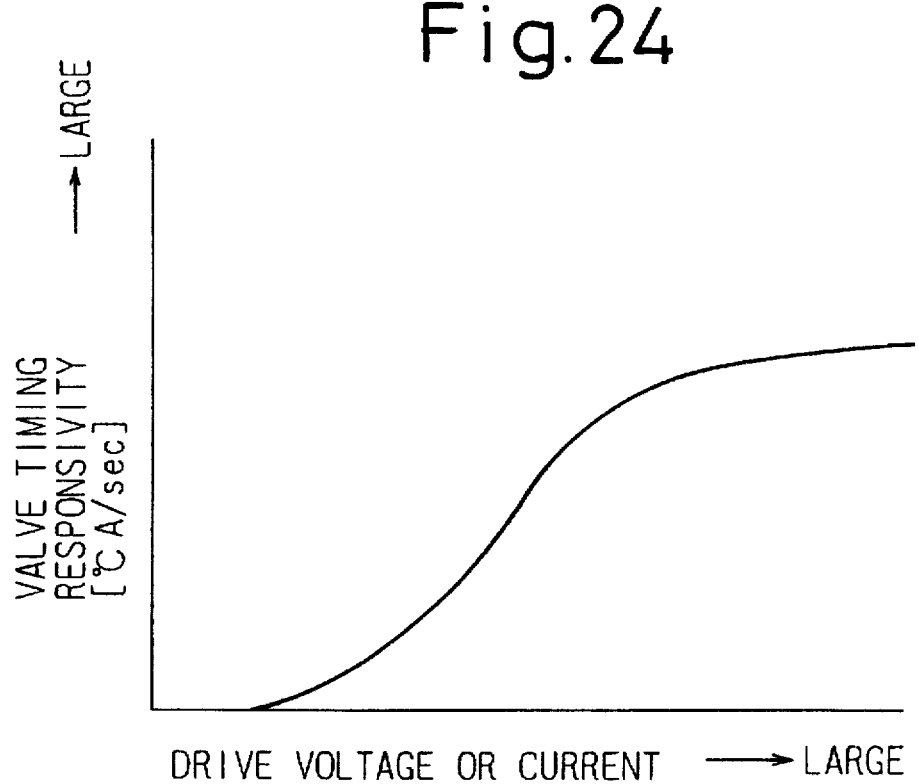
FIG. 24 is a graph showing a relationship of drive voltage or current and responsivity in a motor mechanism for continuously varying valve timing.
Figure 25:
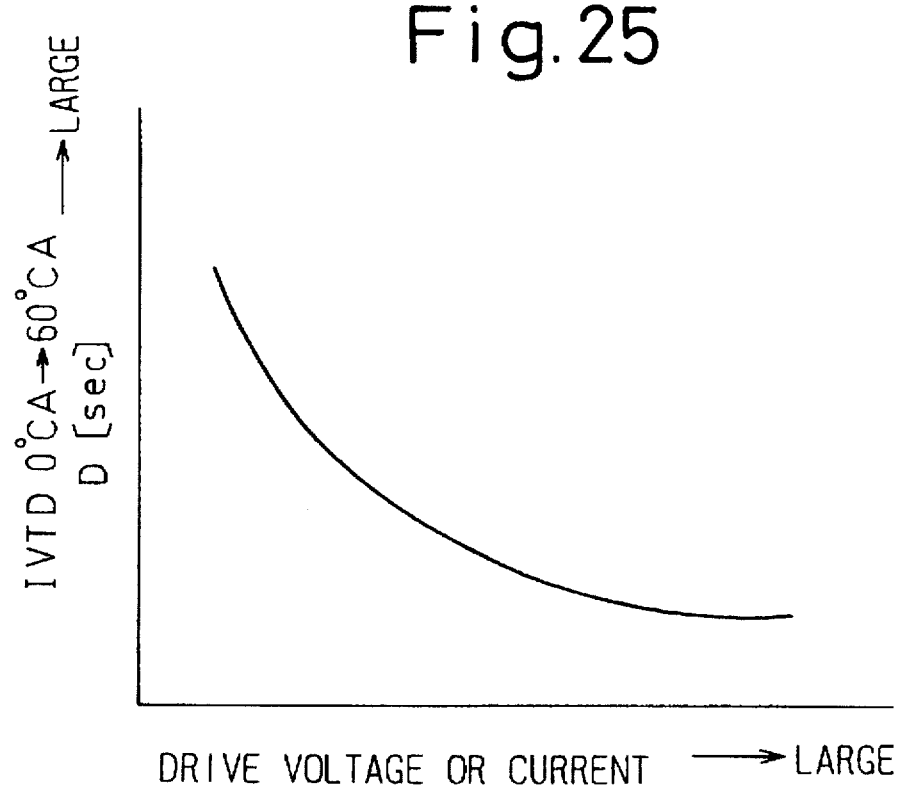
FIG. 25 is a map showing the response delay time of the motor mechanism.

Although the third embodiment is related to the hydraulic mechanism for continuously varying valve timing, it is easily modified to handle a motor mechanism for the same purpose. The responsivity of the motor mechanism is dependent on a drive voltage or current as shown in FIG. 24. Accordingly, a map of response delay time D is prepared as shown in FIG. 25, to carry out the same steps as those of FIG. 23.

Although the present invention has been disclosed and described by way of embodiments, it is apparent to those skilled in the art that other embodiments and modifications of the present invention are possible without departing from the spirit or essential features thereof.

As explained above, the present invention provides an apparatus for detecting the quantity of intake air of an internal combustion engine having a mechanism for continuously varying valve timing, capable of correctly detecting an actual quantity of intake air, which is compared with a reference quantity to determine an atmospheric pressure and an altitude without an atmospheric pressure sensor.

What is claimed is:

1. An apparatus for detecting a quantity of intake air to be compared with a reference quantity in an internal combustion engine having a mechanism for continuously varying an opening and closing timing of at least one of intake and exhaust valves of the engine, comprising:

means for detecting a load of the engine;

means for detecting an actual valve timing;

means for judging, based on the detected load and the detected actual valve timing, whether the actual valve timing is in a stable state with respect to a change in the engine load;

means for detecting an actual quantity of intake air when it is judged by the judging means that the actual valve timing is in a stable state.

2. The apparatus of claim 1, wherein the judging means judges that the actual valve timing is in a stable state when the detected load is high and the actual valve timing is near a target valve timing that is dependent on the high load.

3. The apparatus of claim 1, wherein the judging means judges that the actual valve timing is in a stable state when the detected load is intermediate and the valve timing is near the most advanced valve timing.

4. An apparatus for detecting a quantity of intake air to be compared with a reference quantity in an internal combustion engine having a mechanism for continuously varying an opening and closing timing of at least one of intake and exhaust valves of the engine, comprising:

means for detecting a load of the engine;

means for estimating, when a high load is detected, a response delay time which will elapse before an actual valve timing attains a target valve timing set in response to the detected high load; and means for detecting an actual quantity of intake air after the response delay time has elapsed.

* * * * *